United States Patent
Li et al.

(10) Patent No.: US 9,689,703 B2
(45) Date of Patent: Jun. 27, 2017

(54) PRESENTING HIERARCHIES OF MAP DATA AT DIFFERENT ZOOM LEVELS

(71) Applicant: Google Inc., Mountain View, CA (US)

(72) Inventors: Shuangfeng Li, Beijing (CN); Liyong Chen, Beijing (CN); Lu Han, Beijing (CN); Jian Li, Beijing (CN); Bailiang Zhou, Pyrmont (AU); Chase Hensel, San Francisco, CA (US); Ping Hsin Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 52 days.

(21) Appl. No.: 14/617,210

(22) Filed: Feb. 9, 2015

(65) Prior Publication Data

US 2016/0033295 A1 Feb. 4, 2016

Related U.S. Application Data

(63) Continuation of application No. PCT/CN2014/083247, filed on Jul. 29, 2014.

(51) Int. Cl.
*G01C 21/36* (2006.01)
*G06F 3/0485* (2013.01)
(Continued)

(52) U.S. Cl.
CPC ......... *G01C 21/367* (2013.01); *G06F 3/0485* (2013.01); *G06T 3/40* (2013.01);
(Continued)

(58) Field of Classification Search
None
See application file for complete search history.

(56) References Cited

U.S. PATENT DOCUMENTS 7,069,232 B1 * 6/2006 Fox ............... G06Q 10/06
705/7.31
8,799,799 B1 * 8/2014 Cervelli ............ G06F 3/0481
707/723
(Continued)

FOREIGN PATENT DOCUMENTS

CN 101681566 A 3/2010
CN 102341804 A 2/2012
(Continued)

OTHER PUBLICATIONS

MicroImages, Tilesets:Bing Maps Structure, Apr. 2012, retrieved from <<http://www.microimages.com/documentation/TechGuides/78BingStructure.pdf>>, accessed Jun. 13, 2016.*
(Continued)

*Primary Examiner* — Michael J Cobb
(74) *Attorney, Agent, or Firm* — Lerner, David, Littenberg, Krumholz & Mentlik, LLP

(57) ABSTRACT

In one aspect, a map is provided for display by one or more computing devices. The map includes a first set of geographic locations. The one or more computing devices receive a zoom request for viewing the map. The one or more computing devices then determine whether a zoom level cutoff has been traversed. If so the one or more computing devices may select a second set of geographic locations, from a hierarchy of geographic locations, to be displayed to the user.

20 Claims, 12 Drawing Sheets

(51) Int. Cl.
*G09B 29/10* (2006.01)
*G06T 3/40* (2006.01)
*G06T 11/20* (2006.01)

(52) U.S. Cl.
CPC ............ *G06T 11/20* (2013.01); *G09B 29/106* (2013.01); *G06F 2203/04806* (2013.01)

(56) References Cited

U.S. PATENT DOCUMENTS

| | | | | | |
|---|---|---|---|---|---|
| 2005/0270311 | A1* | 12/2005 | Rasmussen | ........... | G01C 21/367 |
| | | | | | 345/677 |
| 2006/0244638 | A1* | 11/2006 | Lettau | ................ | G01C 21/367 |
| | | | | | 340/995.1 |
| 2007/0294642 | A1* | 12/2007 | Kyle | ................ | G08G 1/096811 |
| | | | | | 715/855 |
| 2012/0110513 | A1 | 5/2012 | Gaertner et al. | | |
| 2012/0117112 | A1* | 5/2012 | Johnston | ............. | G06F 17/3087 |
| | | | | | 707/771 |
| 2012/0299965 | A1* | 11/2012 | Agarwal | ........... | G06F 17/30572 |
| | | | | | 345/660 |
| 2013/0069990 | A1* | 3/2013 | Geise | ................... | G06F 3/0485 |
| | | | | | 345/660 |
| 2013/0321401 | A1* | 12/2013 | Piemonte | ........... | G01C 21/3635 |
| | | | | | 345/419 |
| 2014/0082505 | A1* | 3/2014 | Watson | ................. | G06F 3/0484 |
| | | | | | 715/738 |
| 2014/0306989 | A1* | 10/2014 | Doubleday | ............. | G06T 11/60 |
| | | | | | 345/629 |
| 2016/0349939 | A1* | 12/2016 | Simpson | ........... | G06F 17/30277 |

FOREIGN PATENT DOCUMENTS

| | | |
|---|---|---|
| CN | 102663502 A | 9/2012 |
| KR | 20080082513 A | 9/2008 |

OTHER PUBLICATIONS

MicroImages, Tilesets:Google Maps Structure, Apr. 2012, retrieved from <<http://www.microimages.com/documentation/TechGuides/78googleMapsStruc.pdf>>, accessed Jun. 13, 2016.*
International Search Report and Written Opinion for Application No. PST/CN2014/083247 dated Apr. 28, 2015.

* cited by examiner

PRESENTING HIERARCHIES OF MAP DATA
AT DIFFERENT ZOOM LEVELS

CROSS-REFERENCES TO RELATED
APPLICATIONS

The present application is a continuation application of International Application No. PCT/CN2014/083247, filed on Jul. 29, 2014, which is hereby incorporated herein by reference.

BACKGROUND OF THE INVENTION

Various systems allow users to view maps of different locations on a display of a computing device. In addition, many of these systems allow users to manipulate how the map is viewed. As an example, some map systems provide tools that allow a user to "move" a map, such as by selecting and dragging the map or selecting a point and re-rendering the map centered at the selected point on the display. Some systems may also allow a user to zoom in or out on the map.

BRIEF SUMMARY OF THE INVENTION

Aspects of the disclosure provide a computer-implemented method. The method includes receiving, by one or more computing devices, a request for a map at a first zoom level; accessing, by the one or more computing devices, a hierarchy of geographic locations; determining, by the one or more computing devices, a first set of geographic locations, from the hierarchy of geographic locations, to be presented in the map at the first zoom level; providing for display, by the one or more computing devices, the first set of geographic locations; receiving, by the one or more computing devices, a request to view the map at a second zoom level; determining, by the one or more computing devices, that a zoom level cutoff has been traversed; identifying, by the one or more computing devices, a second set of geographic locations, from the hierarchy of geographic locations, to be presented in the map at the second zoom level; and providing for display, by the one or more computing devices, the second set of geographic locations.

In another example, the second zoom level is a higher level of zoom than the first zoom level; the first set of geographic locations includes a parent geographic location; and the second set of geographic locations includes one or more of the children geographic locations from the parent geographic location. In yet another example, the zoom level cutoff is based on a number of geographic locations that will be displayed at one or more zoom levels.

In still another example, the method includes determining, by the one or more computing devices, a high zoom level for a parent geographic location and a low zoom level for each of a plurality of children geographic locations; and determining the zoom level cutoff based on a comparison of the determined high zoom level and the determined low zoom levels for the plurality of children geographic locations. In yet another example, the map is to be displayed on a viewport, and determining the high zoom level and the low zoom level for a particular geographic location is based on a comparison of the size of the particular geographic location with the size of the viewport.

In another example, the zoom level cutoff is one of a plurality of zoom level cutoffs; the hierarchy of geographic locations includes a plurality of hierarchical levels; and the plurality of zoom level cutoffs are arranged so that at least one zoom level exists in which all geographic locations for a particular hierarchical level are associated with the at least one zoom level.

In yet another example, the method includes accessing, by the one or more computing devices, information relating to the requested map; wherein providing the first set of geographic locations for display further comprises providing for display, by the one or more computing devices, the information at a first granularity that corresponds to the first set of geographic locations; and wherein providing the second set of geographic locations for display further comprises providing for display, by the one or more computing devices, the information at a second granularity that corresponds to the second set of geographic locations.

A further aspect of the disclosure provides for a method that includes receiving, by one or more computing devices, a request for a map to be presented in a viewport; selecting, by the one or more computing devices, a geographic point corresponding to a point within the viewport; identifying, by the one or more computing devices, a set of geographic locations that correspond to the selected geographic point; comparing, by the one or more computing devices, the size of one or more of the geographic locations, from the set of geographic locations, with the size of the viewport; and selecting, by the one or more computing devices, a first geographic location, from the set of geographic locations, based on the comparison of the size of the one or more geographic locations with the size of the viewport.

In another example, the method includes comparing the size of the one or more geographic locations with the size of the viewport further comprises comparing the area of the one or more geographic locations with the area of the viewport. In still another example, selecting the first geographic locations is based on the first geographic location having a size ratio in relation to the viewport that is closest to a predetermined size ratio. The selected geographic point may correspond to a center point within the viewport.

In another example, the method includes selecting, by the one or more computing devices, a set of neighboring geographic locations that neighbor the first geographic location; and providing for display within the viewport the first geographic location and the neighboring geographic locations. In addition, the set of neighboring geographic locations may be selected from a hierarchy of geographic locations, and the neighboring geographic locations may be of the same hierarchical level as the first geographic location.

A further aspect of the disclosure provides a system. The system includes one or more computing devices. The one or more computing devices are configured to receive a request for a map at a first zoom level; access a hierarchy of geographic locations; determine a first set of geographic locations, from the hierarchy of geographic locations, to be presented in the map at the first zoom level; provide the first set of geographic locations; receive a request to view the map at a second zoom level; determine that a zoom level cutoff has been traversed; determine a second set of geographic locations, from the hierarchy of geographic locations, to be presented in the map at the second zoom level; and provide for display the second set of geographic locations.

In one example, the second zoom level is a higher level of zoom than the first zoom level; the first set of geographic locations includes a parent geographic location; and the second set of geographic locations includes one or more of the children geographic locations from the parent geographic location. In addition, the zoom level cutoff may be based on a number of geographic locations that will be displayed at one or more zoom levels.

In another example, the one or more computing devices are further configured to determine a high zoom level for a parent geographic location and a low zoom level for each of a plurality of children geographic locations; and determine the zoom level cutoff based on a comparison of the determined high zoom level and the determined low zoom levels for the plurality of children geographic locations. In another example, the map is to be displayed on a viewport, and determining the high zoom level and the low zoom level for a particular geographic location is based on a comparison of the size of the particular geographic location with the size of the viewport.

In still another example, the zoom level cutoff is one of a plurality of zoom level cutoffs; the hierarchy of geographic locations includes a plurality of hierarchical levels; and the plurality of zoom level cutoffs are arranged so that at least one zoom level exists in which all geographic locations for a particular hierarchical level are associated with the at least one zoom level.

DETAILED DESCRIPTION

Overview

Figure 1:
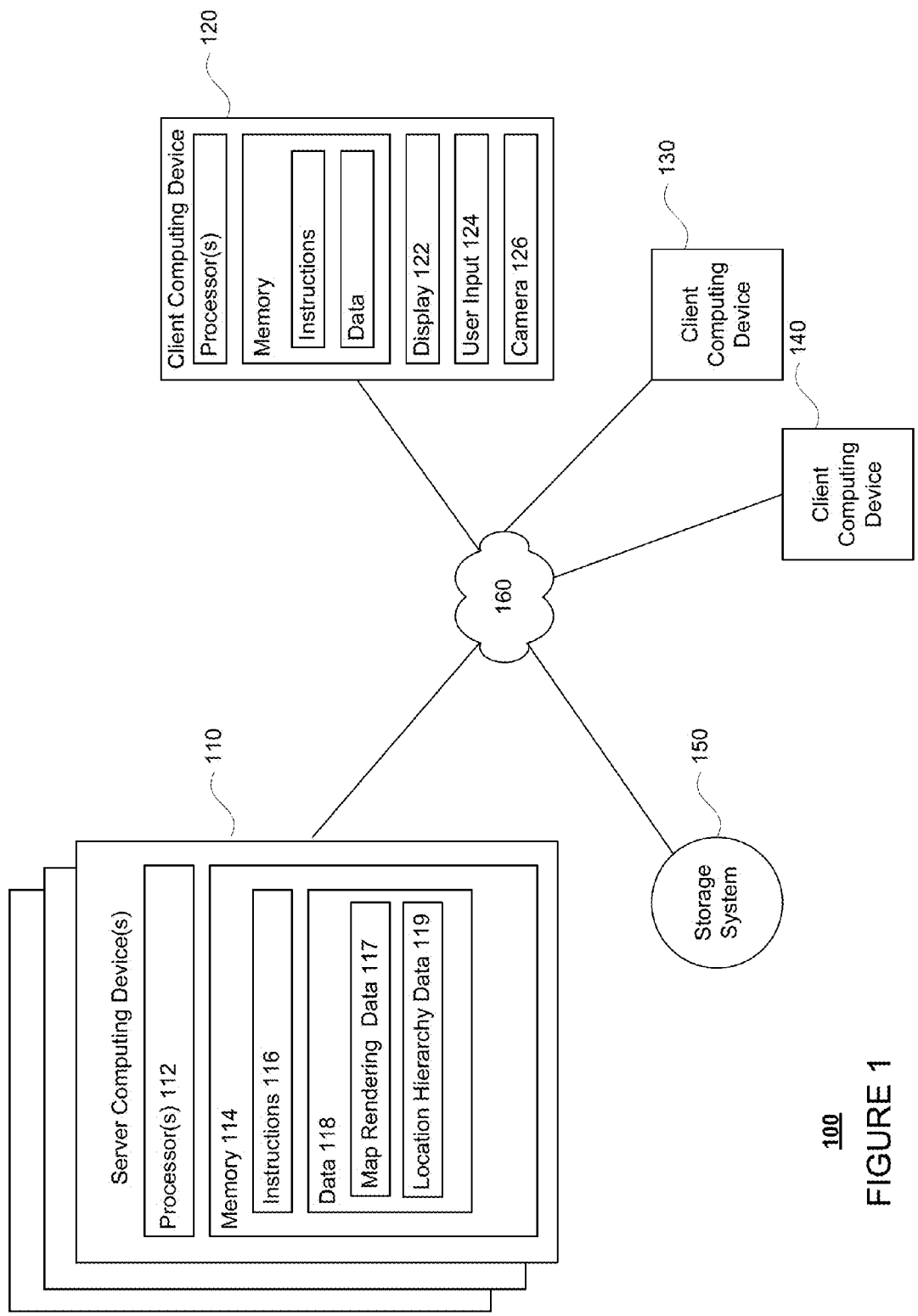
FIG. 1 is a functional diagram of an example system in accordance with aspects of the disclosure.

The technology relates generally to providing users with useful map data at different zoom levels. As noted above, a user may zoom into or out of a map, thereby changing the geographic region being displayed to the user. In one aspect of the technology, the user may be presented with a set of geographic locations within the map that is dependent on the current zoom level in which the map is being viewed.

In response to the user's request the user's client device may retrieve map information from a remote location, such as a server computer, or from local storage. The client device may then render a display of a map. In addition to the geographic data presented in the map, additional map-related information may be presented to the user. For example, the user may be able to select one or more geographic locations within the map, so as to view census or survey data associated with the selected geographic regions. In another example, the user may be presented with photographs, or other user generated content, that relates to the selected geographic location.

In accordance with one aspect of the technology, a hierarchy of geographic locations may be generated and accessed so as to determine the particular geographic locations that are to be presented to the user at different levels of zoom. At a low zoom level, relatively large geographic locations may be displayed in the map, such as continents or countries. However, as the user zooms into the map, the presented geographic locations may automatically change. For example, the geographic locations presented to the user may transition from country-level locations to state-level and province-level locations. The user may then be able to select specific states and provinces in the map, in order to view information relating to those selected state and provinces. Accordingly, the granularity of the information presented to the user may automatically change as the user zooms into or out of the map.

In one example, a server computer or client computer may determine which geographic locations are to be presented to the user by comparing the size of candidate geographic locations with the size of the viewport at the current zoom level. These candidate geographic locations may be selected from a hierarchy of geographic locations, in which parent geographic locations may be split into children geographic locations.

Based on the comparison of the sizes of the geographic locations, the server or client computer may select a set of geographic locations that will be manageable for the user to view. For example, the geographic locations may be selected so that the map displays more than just a few locations in the map, but does not a large number of very small locations. In one aspect of the disclosed technology, the system may assign particular geographic locations within the hierarchy to particular zoom levels, so as to provide the user with an appropriate set of geographic locations.

In another aspect, map related content, such as photographs containing geographic location metadata, may be displayed to the user, along with a list of users that have provided the photographs. In one example, the user may be presented with a list of top photographs and top photograph contributors. These list of top photographs and top contributors may correspond to the geographic location that is currently being viewed by the user in a map viewport. The list of top photographs and top contributors may then be automatically updated as the user pans or zooms within the map. In this way, the user may be presented with real-time data relating to the particular geographic region being viewed by the user. In addition, the user may select particular geographic locations within the map. As discussed above, those geographic locations may be selected based on a comparison of the current zoom level with a hierarchy of geographic locations.

Example Systems

Figure 2:
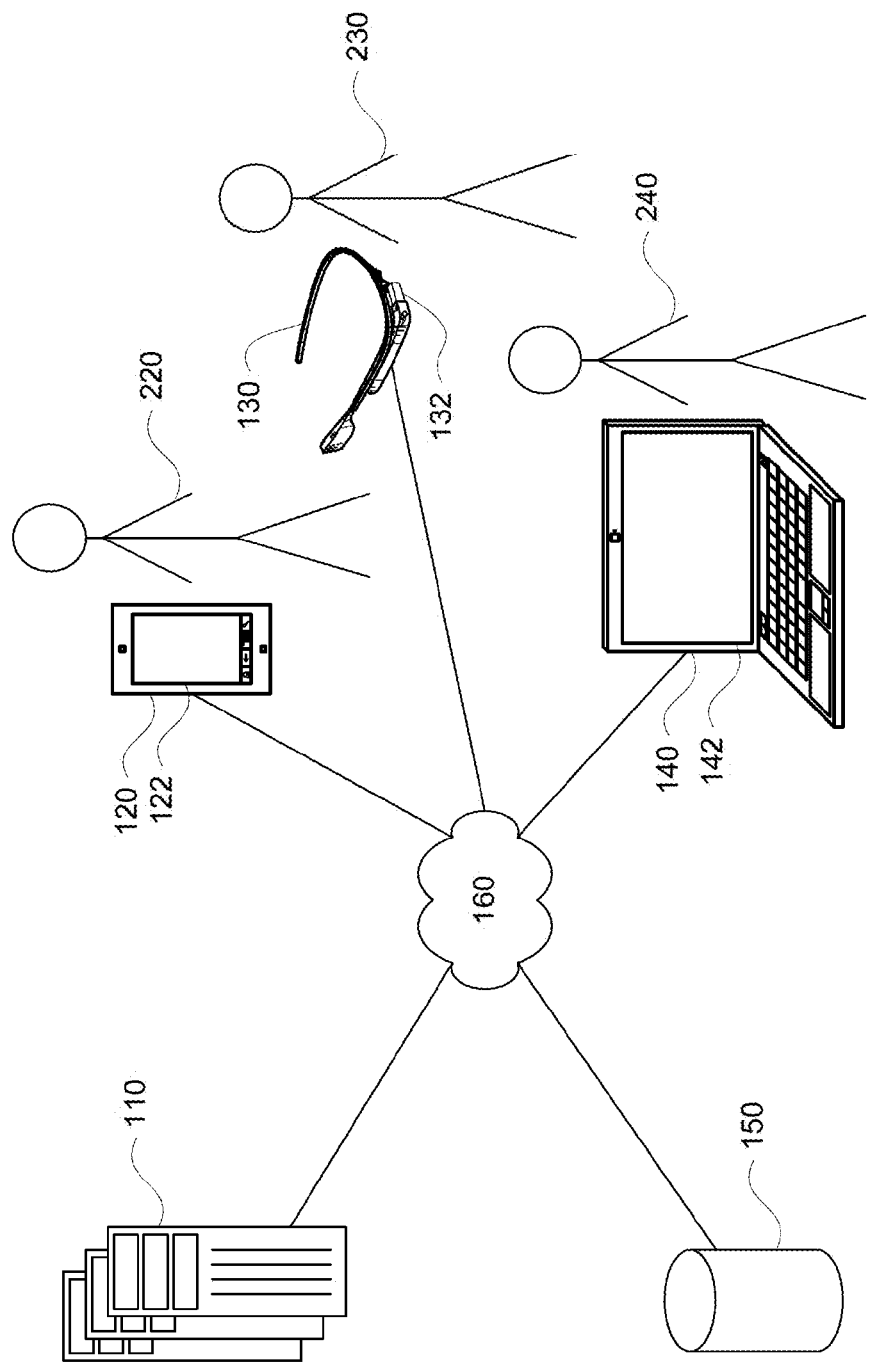
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera 126 for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store map information as well as imagery data. For example, the map information may include vector data used to draw individual map features. The imagery data may include any type of images that can be used to replace, overlay or augment the map information. As an example, this imagery data can include satellite images, aerial images, or other such images.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

A user may request to view a map on his or her client device. This request may include information that can be used to identify a relevant portion of a map, such as an address, location coordinates, landmark or business name, an image of a location, or any other such information. Server devices 110 may respond by retrieving map information from storage system 150 and sending it to the client device 120. Alternatively, client device 120 may retrieve the map from local storage. The map or map information may thus be provided to the client device for display to the user. If the map is a vector-based map, the provided map information may include a plurality of vectors that can be used by the client device to render an image of a map.

In accordance with one aspect of the disclosed system, maps may be organized into a hierarchy of geographic locations. For example, the hierarchy of geographic locations may include levels that correspond to countries, provinces/states, counties, cities, and neighborhoods. A particular set of geographic locations within the hierarchy may then be displayed within a map based on the level of zoom that has been selected by the user.

Figure 3:
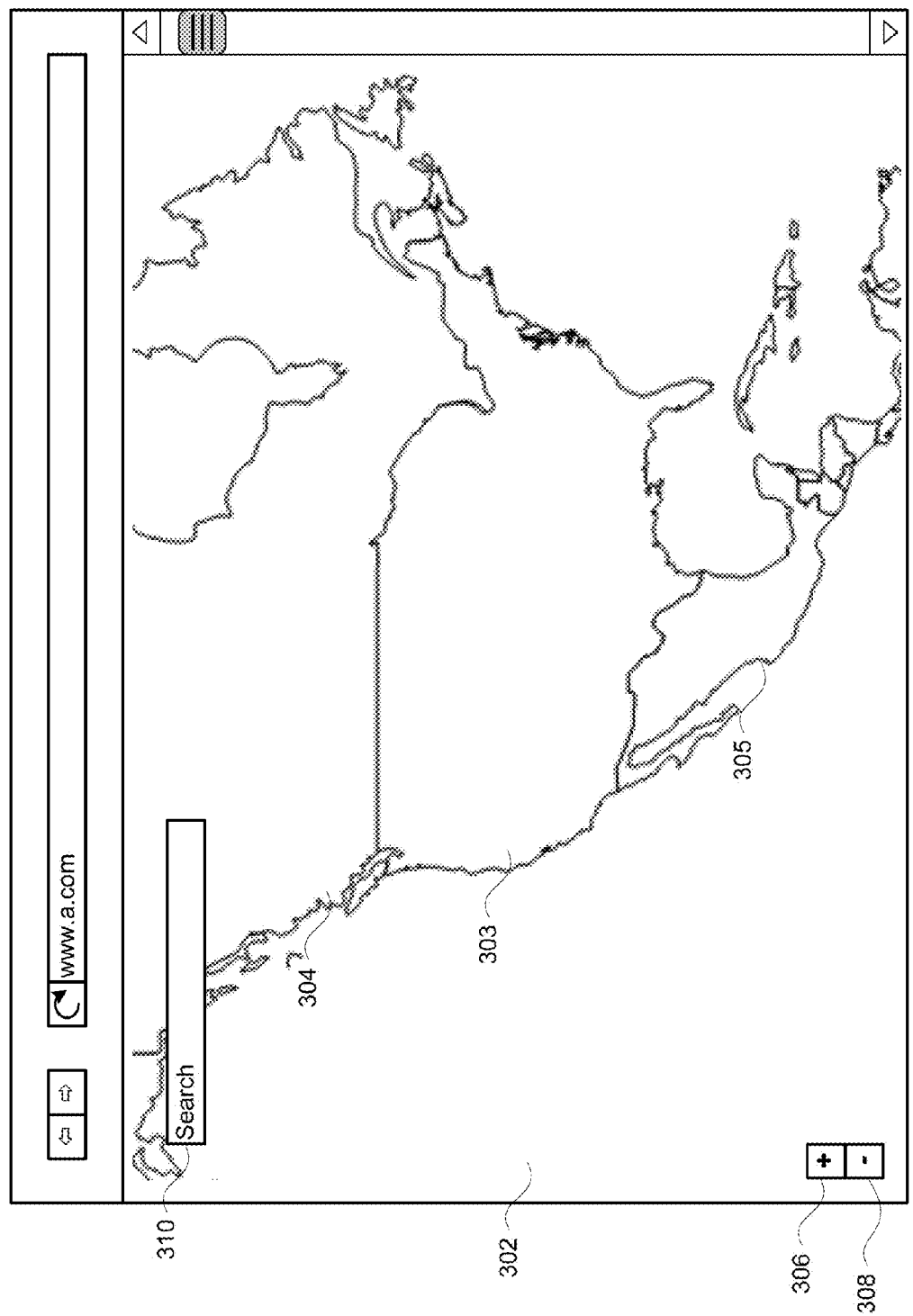
FIG. 3 is an example screen shot in accordance with aspects of the disclosure.

For example, FIG. 3 shows a screen shot 300 of map 302 that may be displayed on client device 120. Map 302 is at a relatively low level of zoom and is divided by country-level geographic locations, including the United States 303, Canada 304, and Mexico 305. The user of client device 120 may search for a particular location within the map by entering a query into the search field 310. The user may also alter the zoom level of map 302. For example, the user may select icon 306 to zoom into map 302 and may select icon 308 to zoom out from map 302.

Figure 4:
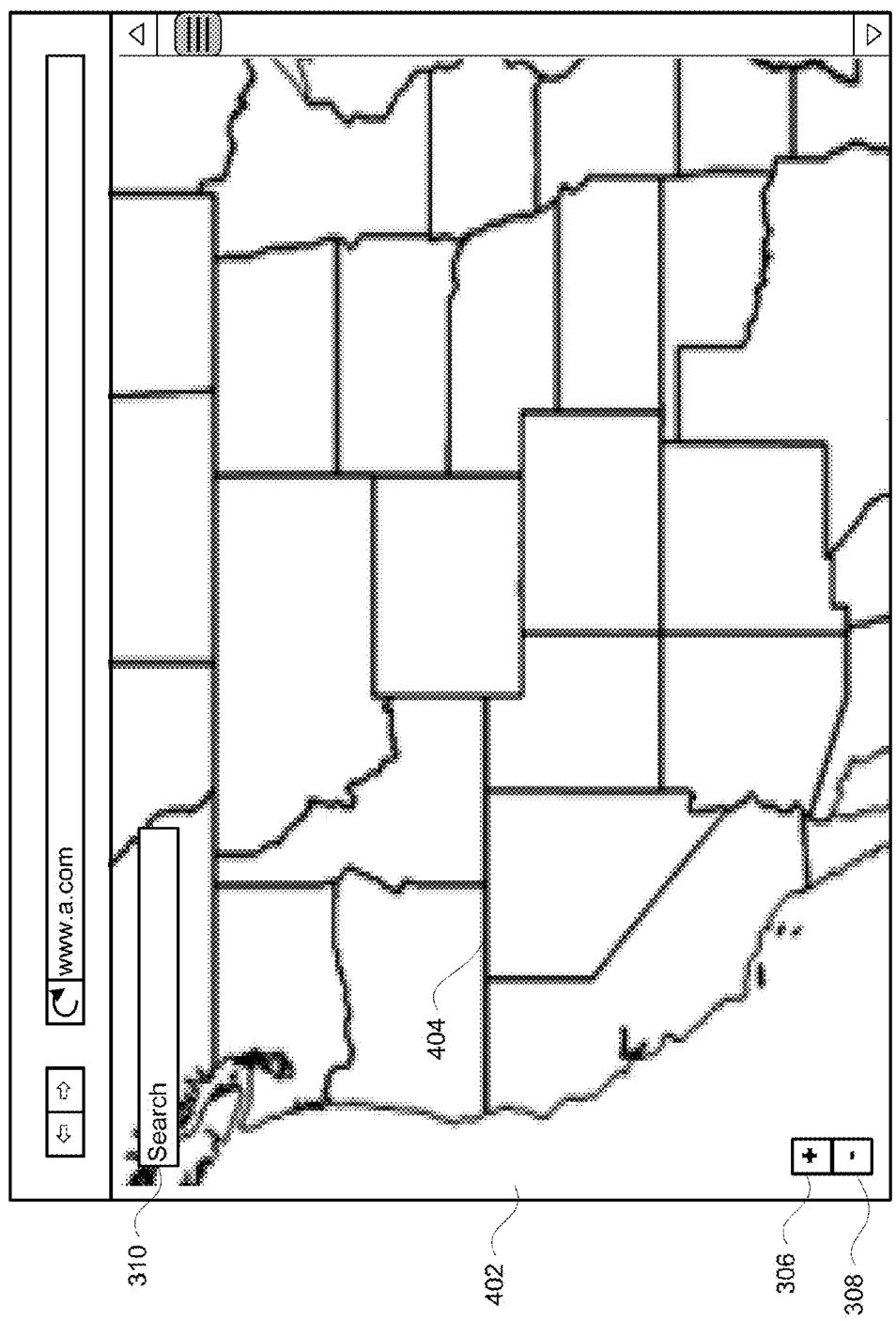
FIG. 4 is another example screen shot in accordance with aspects of the disclosure.

FIG. 4 shows screen shot 400 of map 402 in which the user has selected icon 306 to zoom in from map 302. As the user zooms in, the geographic locations displayed within the map change from the country-level locations shown in map 302 to the state-level locations shown in map 402. Accordingly, while map 302 was divided by country, map 402 is divided by the state boundaries 404. Similarly, if the user continues to zoom into map 402, the map may transition again from displaying state-level locations to displaying county-level or city-level locations.

Figure 5:
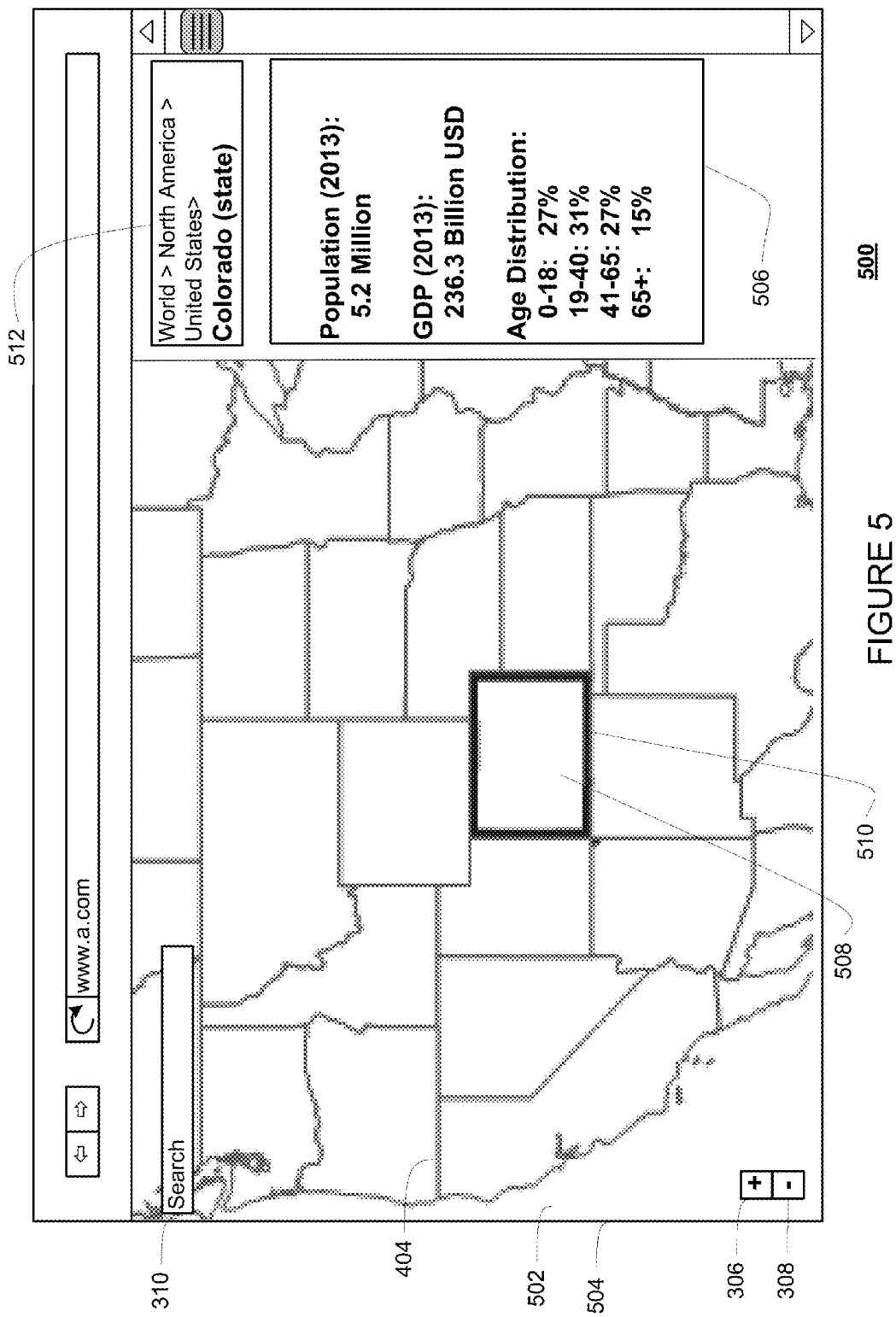
FIG. 5 is a further example screen shot in accordance with aspects of the disclosure.

By automatically transitioning the map between different levels of a geographic location hierarchy, the disclosed system provides a map to the user that can display information at a desired level of granularity. For example, FIG. 5 is a screen shot 500 in which a map 502 is displayed in viewport 504, with relevant location information 506 being displayed next to viewport 504. Similar to map 402 of FIG. 4, map 502 is being displayed at a zoom level in which the map is divided into state-level geographic locations, as shown by the state borders 406. In accordance with one aspect, a user may select one or more of the geographic locations being displayed on map 502. The selection of geographic locations may be performed using any number of input devices such as by selecting the geographic locations with a computer mouse cursor (not shown) or by inputting a query into search field 310. In the case of a touch screen, the user may select geographic locations by tapping the desired locations on the map. The map may display a visual indicia indicating which geographic locations have been selected by the user. For example, in Map 502, the user has selected geographic location 508. The selection of geographic location 508 has been indicated by the visual indicia of altering the color and thickness of state border 510.

In addition, screen shot 500 includes identification 512, which identifies the name of the geographic location that has been selected by the user. Identification 512 may also identify the hierarchical level of the selected geographic location. For example, identification 512 indicates that geographic location 508 is Colorado, and that it is a state that resides within the parent geographic locations of "World," "North America," and "United States."

The location information displayed with a map may automatically correspond to the selected geographic locations within the displayed map. For example, location information 506 shown in screen shot 500 corresponds to the geographic location 508 of Colorado. Location information 506 may include any information that is available to server devices 110 or client device 120, including information accessible over the Internet. For example, server device 110 may access stored census data in order to provide population and GDP data, such as location information 506 shown in screen shot 500. As will be discussed further below, location information may also include information that has been provided from other users. For example, the location information may include photographs that have taken by other users and have been uploaded to server devices 110 of FIG. 1 from various client devices, including client devices 120, 130, and 140.

Figure 6:
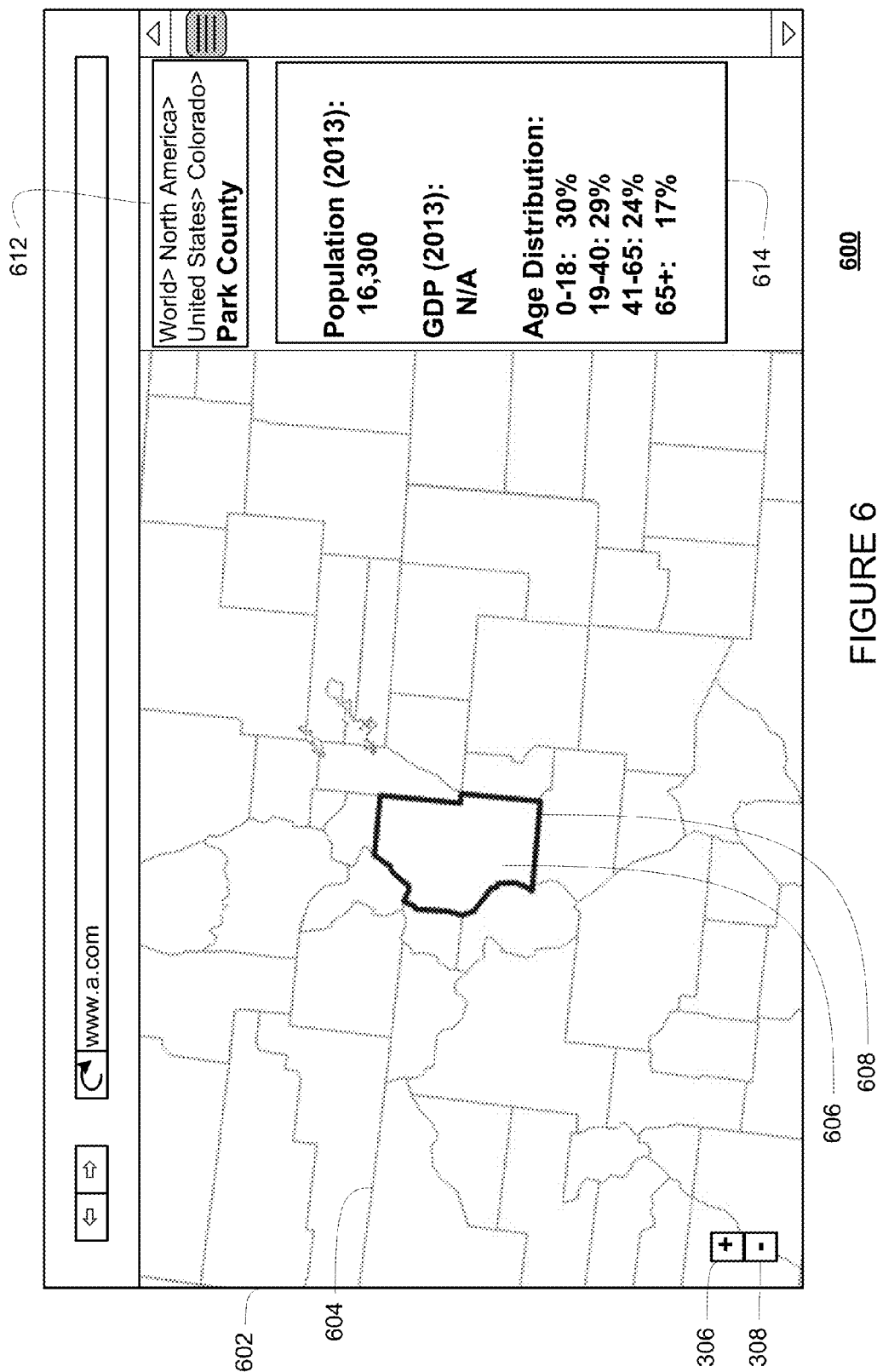
FIG. 6 is still another example screen shots in accordance with aspects of the disclosure.

As set forth above, the user may zoom into map 502, so as to cause the map to automatically transition from displaying the state-level geographic location 508 to displaying the next level of geographic locations. For example, screen shot 600 of FIG. 6 shows map 602, which is a result of the user zooming into geographic location 508 shown in FIG. 5. In map 602, state-level geographic location 508 has been replaced with county-level geographic locations, as indicated by the county-level borders 604. The user may again select one or more geographic locations shown within map 602, however the user will now select from the set of county-level locations, rather than state-level locations. As indicated by border 608, the user has selected geographic location 606 within map 602. Identification 612 indicates that geographic location 606 is "Park County" and that it is a part of the parent geographic locations "World," "North America," "United States," and "Colorado." Upon selecting geographic location 606, corresponding location information 614 is displayed. The user may then continue to select various county-level geographic locations within map 602 in order to obtain county-level location information.

Figure 7:
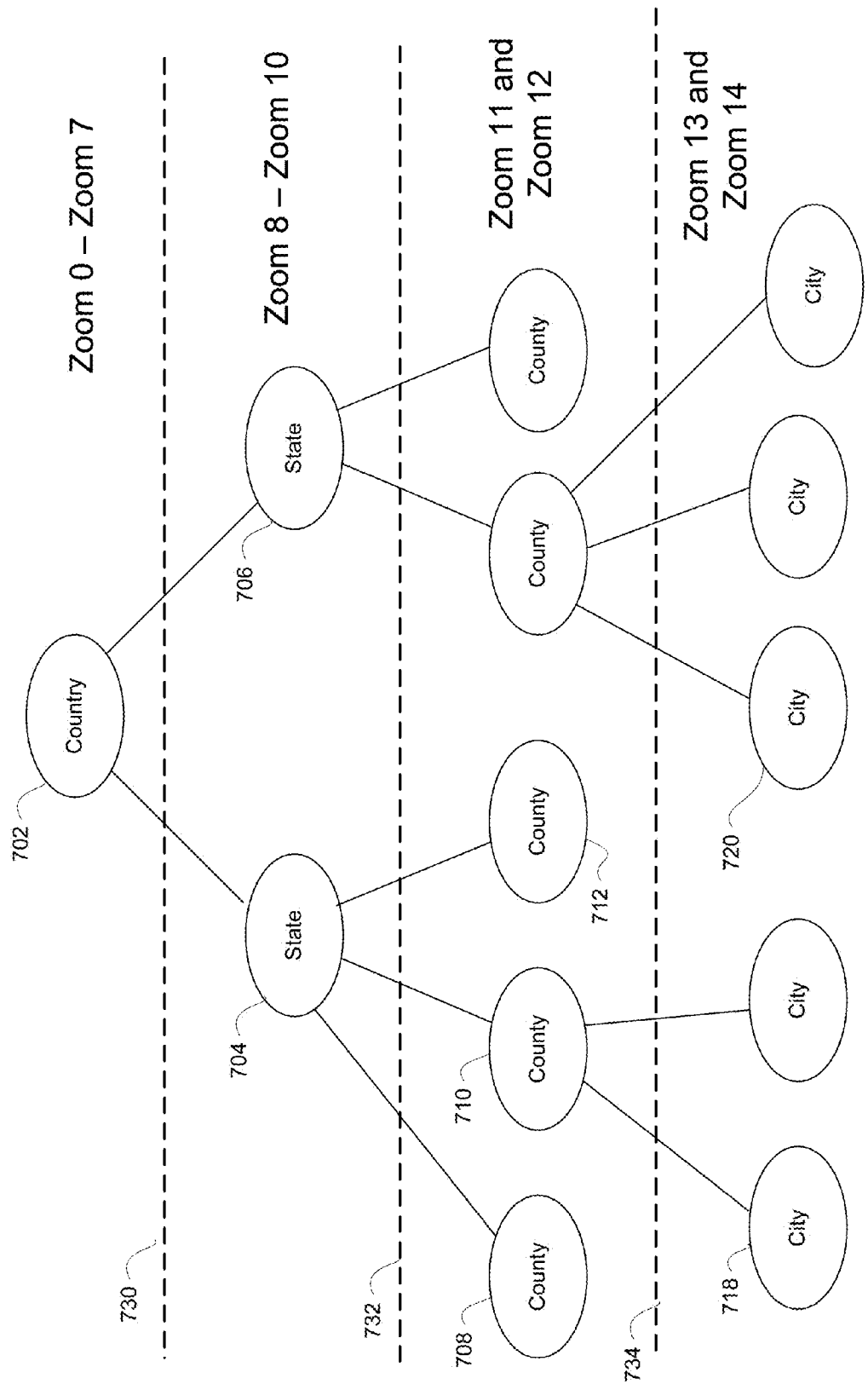
FIG. 7 is an example diagram of a geographic location hierarchy in accordance with aspects of the disclosure.

Accordingly, system 100 may generate maps that display different hierarchical levels of the geographic locations for different levels of zoom. For any particular zoom level, system 100 may determine the appropriate geographic locations to be displayed within the map. In accordance with one aspect of the technology, server devices 110 or client device 120 may associate particular geographic locations with particular zoom levels. FIG. 7 shows tree 700 of an example geographical location hierarchy. In tree 700, each geographic location is associated with one or more zoom levels. Relatively low zoom within the map are designated with low zoom level numbers, such as zero through seven, while higher zoom is indicated by higher numbers, such as thirteen and fourteen. Dashed lines 730, 732, and 734 indicate the zoom level cutoffs at which the map will transition from a first geographic location to a second geographic location.

For example, as indicated in tree 700, country 702 will be displayed at zoom levels zero through seven, while states 704 and 706 will be displayed for zoom levels eight through ten. Accordingly, at zoom level seven, the map will display the geographic location of country 702. However, if a user zooms into the map to zoom level eight, the map will be divided into geographic locations corresponding to states 704 and 706, rather than country 702. If the map is presented at zoom levels 11 and 12, the map will be divided into county-level geographic locations, such as counties 708, 710 and 712. Similarly, the map will be divided into city-level geographic regions, such as city 718 and city 720, at zoom levels 13 and 14. While FIG. 7 shows only show zoom level 0 through zoom level 14, the disclosed system is not limited to any fixed number of zoom levels. Accordingly, higher zoom levels, as well as intermediate zoom levels may be added, depending on the granularity of information that is available for the maps to be displayed.

The hierarchical tree of geographic locations may be designed so that all geographic locations at the same hierarchical level appear within the same range of zoom levels. For example, tree 700 presents a hierarchical structure in which all state-level geographic locations appear for the same zoom levels (i.e., zoom 8-zoom 10), while all county-level geographic locations appear at zoom 11 and zoom 12.

However, the hierarchical tree of geographic locations may be generated so that only a subset of a particular hierarchical level appears for particular zoom levels. For example, in hierarchical tree 800 of FIG. 8, the map will present counties 814 and 816 as distinct geographic locations at zoom level 11, while counties 810 and 812 will not be presented as distinct geographic locations at zoom level 11. Accordingly, at zoom level 11, the parent hierarchical level of counties 810 and 812 (i.e., state 802) will be presented instead of counties 810 and 812. Similarly, city 818 will be presented at zoom level 13, while city 820 will not be presented until zoom level 14. Accordingly, under the hierarchical structure presented in tree 800, the map will present distinct geographic locations that are at different hierarchical levels for at least some of the available zoom levels. However, in accordance with one aspect, the disclosed system may divide a parent location into all available children locations of the next hierarchical level. For example, once the map presents county 810 as a distinct geographic location, all other counties within state 802, including county 812, may presented as distinct geographic locations. Accordingly, at zoom level 12, state 802 is completely replaced by county-level geographic locations that reside within state 802.

Figure 8:
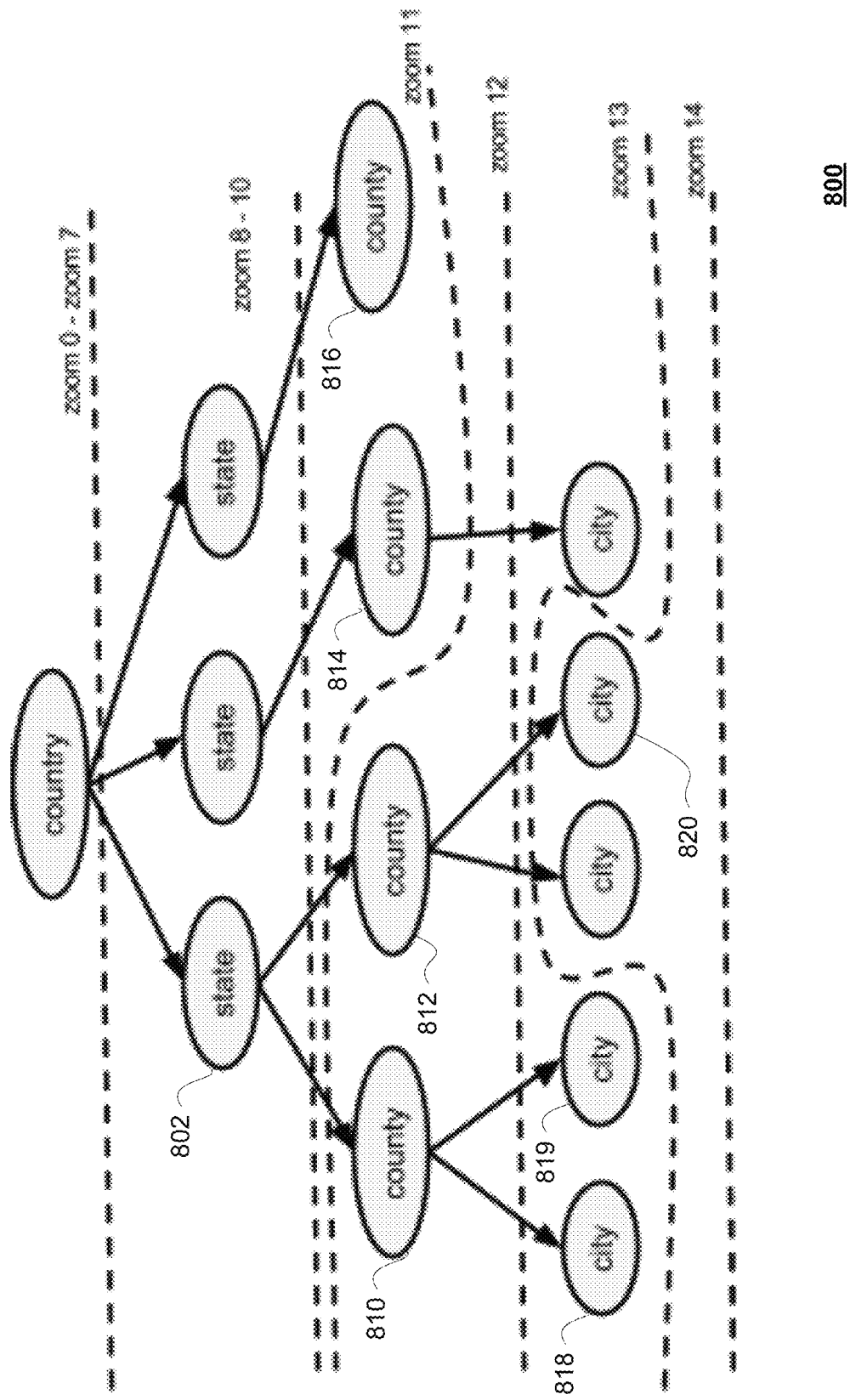
FIG. 8 is another example diagram of a geographic location hierarchy in accordance with aspects of the disclosure.

It is not necessary for a hierarchical level to exist for every geographic position. For example, while county 810 may be divided into cities 818 and 819, county 816 may not have a city-level geographic location associated with it. Therefore, at zoom levels 13 and 14, the map may continue to present county 816 as a distinct geographic unit, even though other counties are divided into city-level locations. In addition, while only four hierarchical levels are shown in FIGS. 7 and 8, any number of hierarchical levels may be used by the disclosed system. For example, the hierarchical structure may include continents or sub-continents that are parent geographic locations to the country-level geographic location. Similarly, the hierarchical structure may continue to divide the city-level geographic locations into smaller children locations, such as district-level and neighborhood-level locations. In this way, the user may continue to zoom into a map in order to receive map information at any granularity for which the map information exists.

In accordance with one aspect of the technology, the disclosed system may divide a map in accordance with one of a plurality of different hierarchies, with each hierarchy containing a different set of geographic location types. For example, a first hierarchy may include geographic location levels corresponding to states, counties, cities, and neighborhoods, while a second hierarchy may include geographic location levels corresponding to states, congressional districts, and congressional precincts. In addition, different geographic locations within a particular map may include a different set of geographic location types. For example, a map may include both the United States and Canada, with the United States being divided using a different set of location types than Canada. In particular, Canada may be divided in the map based on a hierarchy of territories, provinces, districts, and neighborhoods, while the United States may be divided into a hierarchy of states, counties, and neighborhoods. Accordingly, there need not be consistency in the geographic locations that are shown for different countries. However, in one aspect of the technology, the zoom ranges may be arranged so as to maintain consistency of hierarchical levels within a particular country.

Returning to FIG. 1, server devices 110 may store location hierarchy data 119 and map rendering data 117. Location hierarchy data 119 may contain lists of geographic locations associated with one or more maps. In accordance with one aspect, server devices 110 may generate a geographic hierarchy, such as trees 700 and 800 discussed above, by selecting from the lists of geographic locations. In selecting the geographic locations that are to be included in the geographic hierarchy, server devices 110 may determine which types of geographic locations are appropriate for a particular application. For example, a different hierarchy may be used for displaying a map that presents census data than a map that presents the geographic locations of photographs.

In generating a geographic hierarchy, server devices 110 may select from geographic locations that will cover all or most of the viewport for any or most map zoom levels. In particular, server devices 110 may generate a hierarchy in which each parent geographic location is completely or substantially covered by the next level of children locations, with little or no overlap between the children locations. This may be referred to as a split-and-cover hierarchy, wherein there is close to a one-to-one correspondence between each parent location and all of its children locations.

By generating a split-and-cover hierarchy, the user may be presented with map information that can be divided into distinct levels of granularity. For example, the map information shown in FIG. 5 may be broken down into county-level data shown in FIG. 6. If the county-level locations create a one-to-one correspondence with Colorado, the census data for all of Colorado's counties may be combined in order to generate census data for the state of Colorado as a whole.

In generating the hierarchy of geographic locations, the disclosed system may use various forms of data, including postal addresses and geometry information. For example, in some countries, the postal addresses may be in a hierarchical form, in which the province, district, and city are listed. In another example, server devices 110 may compare the geometries of various geographic locations to determine which children geographic locations split and cover a parent geographic location. Sever devices 110 may also detect where duplicated locations are present in the potential geographic hierarchy. In this instance, one of the geographic locations in the hierarchy may be excluded, especially in instances where the map is still covered by the remaining geographic locations.

As discussed above, the disclosed system may select the level or levels of the geographic hierarchy that are to be displayed for a particular zoom level. For example, as shown in FIGS. 7 and 8, each geographic location may be assigned with a particular range of zoom levels. The range of zoom levels may be determined based on the shape and size of the geographic locations that are present in the hierarchy. In particular, the range of zoom levels may be selected so that the map viewport displays an appropriate number of geographic locations or so that all of the geographic locations are displayed with an appropriate size. For example, the range of zoom levels shown in FIGS. 7 and 8 may be selected so that the number of geographic locations shown in the viewport will always be between 10 and 100.

In another example, the range of zoom levels may be determined based on the ratio of geographic location's size compared with the viewport's size. Different measures of geographic location size may be used. For example, the sizes may be based on the total area or on independent comparisons of the height and width of the geographic location. For each zoom level, a comparison of the pixel size ratio between the geographic location and the viewport may be made. Based on this comparison, a determination may then be made as to the lowest zoom level at which the geographic location should be shown, as well as the highest zoom level at which the geographic location should be shown. In one example, the highest zoom level may correspond to the geographic location being no more than 40 percent of the area of the viewport, while the lowest zoom level may correspond to the geographic location being at least one percent of the viewport area. The zoom ranges of the parent and children locations may then be compared to determine the appropriate zoom level cutoffs at which the map will transition between the parent and the child.

In some instances, all of the children locations of a particular parent location will have a lowest zoom level that is lower than or equal to the highest zoom level of the parent location. In this case, the map may identify the zoom level cutoff as being between any zoom levels that are lower than the parent location's highest zoom level and also higher than all of the lowest zoom levels for all of the children locations. However, in other cases, at least some of the children locations' lowest zoom levels will be higher the parent location's highest zoom level. In these instances, a geographic location may be displayed, even though the current zoom level is outside the geographic location's range of zoom levels. For example, the disclosed system may determine the appropriate zoom level cutoff by determining the zoom level at which a certain percentage of the children locations will be within a zoom level range. In particular, the zoom level cutoff may be determined to be the point at which the zoom level is at or higher than 80% of the children locations' lowest zoom level. In another example, the zoom level cutoff may be determined based on the ratio of the area of the parent location within the viewport. For example, the zoom level cutoff may be made at the point at which the parent location covers 80% or more of the viewport, even if all of the children locations are not yet within their lowest zoom level. In yet another example, the zoom level cutoff may be restricted so that no more than a predetermined number of children locations will be shown, such as 200. In this example, all of the children locations of a parent location may not be shown together in the same viewport, if the parent location contains more than the predetermined number of children locations. In still another example, the zoom level cutoffs may be selected so that at least one zoom level exists in which all geographic locations of a particular type are assigned to that zoom level. For example, a particular zoom level may exist in which all states within the United States are assigned to that particular zoom level. In addition to the above examples, the top level of any geographic hierarchy may be displayed at the lowest available zoom level (i.e., zoom 0), while the leaf geographic locations (i.e., those that do not have any children), will continue to be displayed for the highest zoom levels. Different combinations of the zoom level cutoff examples described above may be used in generating a particular map.

In yet another aspect, the geographic locations to be displayed in a map may be selected by dynamically filling in the map with geographic regions for any given viewport. For example, the center position of the viewport may be identified, along with the potential geographic locations within the hierarchy that correspond to the center position. The potential geographic locations may then be compared to the current viewport to determine which of the potential geographic locations have an area that is closest to being a predetermined ratio of the current viewport area. That geographic location may then be selected for display along with neighbors of the selected geographic location. For example, the predetermined ratio may be one-ninth, so that the selected geographic location will be the location, from the potential geographic locations, that has an area that is closest to being one-ninth of the viewport area. The neighboring locations of the selected geographic locations may all be selected from the same hierarchical level as the first selected geographic location. However, a determination may be made whether a different hierarchical level should be used for one or more of the neighboring locations. In particular, a determination may be made as to whether more or fewer locations should be displayed within the viewport. If the viewport contains too many locations, the parents of the neighboring locations may be used. Similarly, if the viewport contains too few locations, the children of one or more of the neighboring locations may be used.

Returning to FIG. 1, the determination of the geographic locations to be displayed for a particular viewport, as well as the rendering of those geographic locations, may be performed by the server devices 110, by the client devices 120, 130 and 140, or by some combination of those devices. In addition, the determination of which geographic locations that are to be displayed for a given zoom level may be made upon the user requesting a particular map (i.e., in real-time) or prior to the map being requested by the user.

As discussed above, the disclosed system may provide the user with map information along with the displayed map. This map information may include user generated content that has been provided by one or more users of the system. For example, contributors may upload photographs from client devices 120, 130, and 140 shown in FIG. 1 to server devices 110. Each photograph may include geographic position data, such as longitude and latitude coordinates and orientation data, which identifies the photograph as being taken a particular location. In accordance with one aspect, the map information displayed to the user may identify particular photographs and contributors that are associated with the region of the map that is currently being displayed in the viewport.

Figure 9:
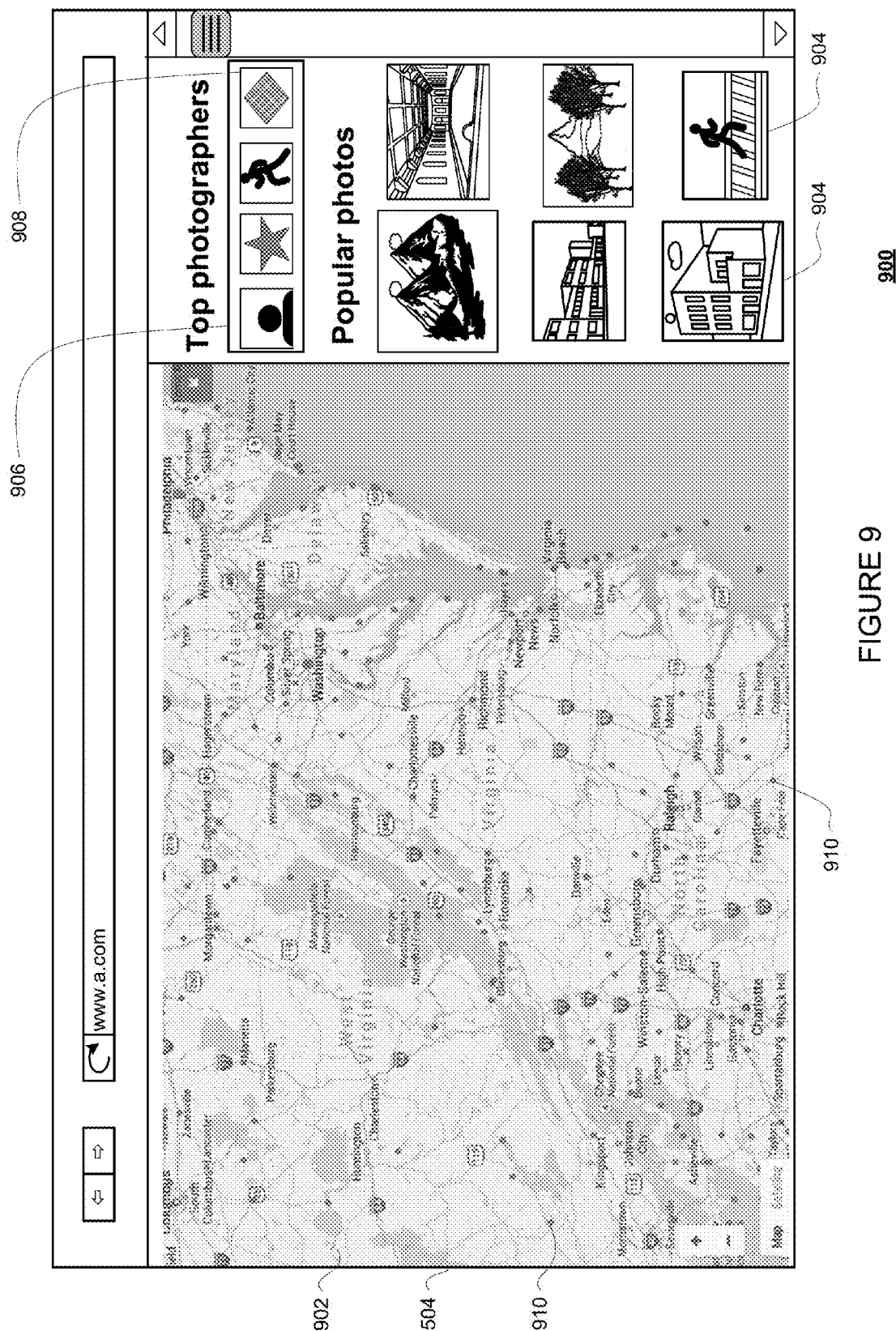
FIG. 9 is an example screen shot in accordance with aspects of the disclosure.

FIG. 9 shows screen shot 900, in which map 902 is being displayed along with a set of photographs 904. In accordance with one aspect of the disclosed system, the photographs 904 may be selected from the set of photographs that have geographic position data that corresponds to a location within the region of map 902 shown in viewport 504. In addition, the disclosed system may display the top contributors for the region shown in viewport 504. For example, screen shot 900 displays a leaderboard 906 of top contributors for the map region shown in viewport 504. The top contributors within the leaderboard may be identified in any number of ways, such as name, user ID, or other profile information. For example, leaderboard 906 identifies the top contributors by present the contributors' profile photos 908. These profile photos 908 may be selectable by the user. Upon selecting a profile photo 908, the user may be presented with additional information about that contributor, including additional photographs that the contributor has provided. In another example, the user may scroll through leaderboard 906 and the list of displayed photographs 904 in order to see additional contributors and additional photographs.

Map 902 may also contain a set of points 910 corresponding to locations in which one or more photos have been taken. The user may select a point 910, such as by using a pointing device or by touching the point 910 on a touchscreen. Upon selecting a point 910, the user may be presented with photo(s) that correspond to that point, as well as identification of the contributor(s) that provided those photo(s).

Figure 10:
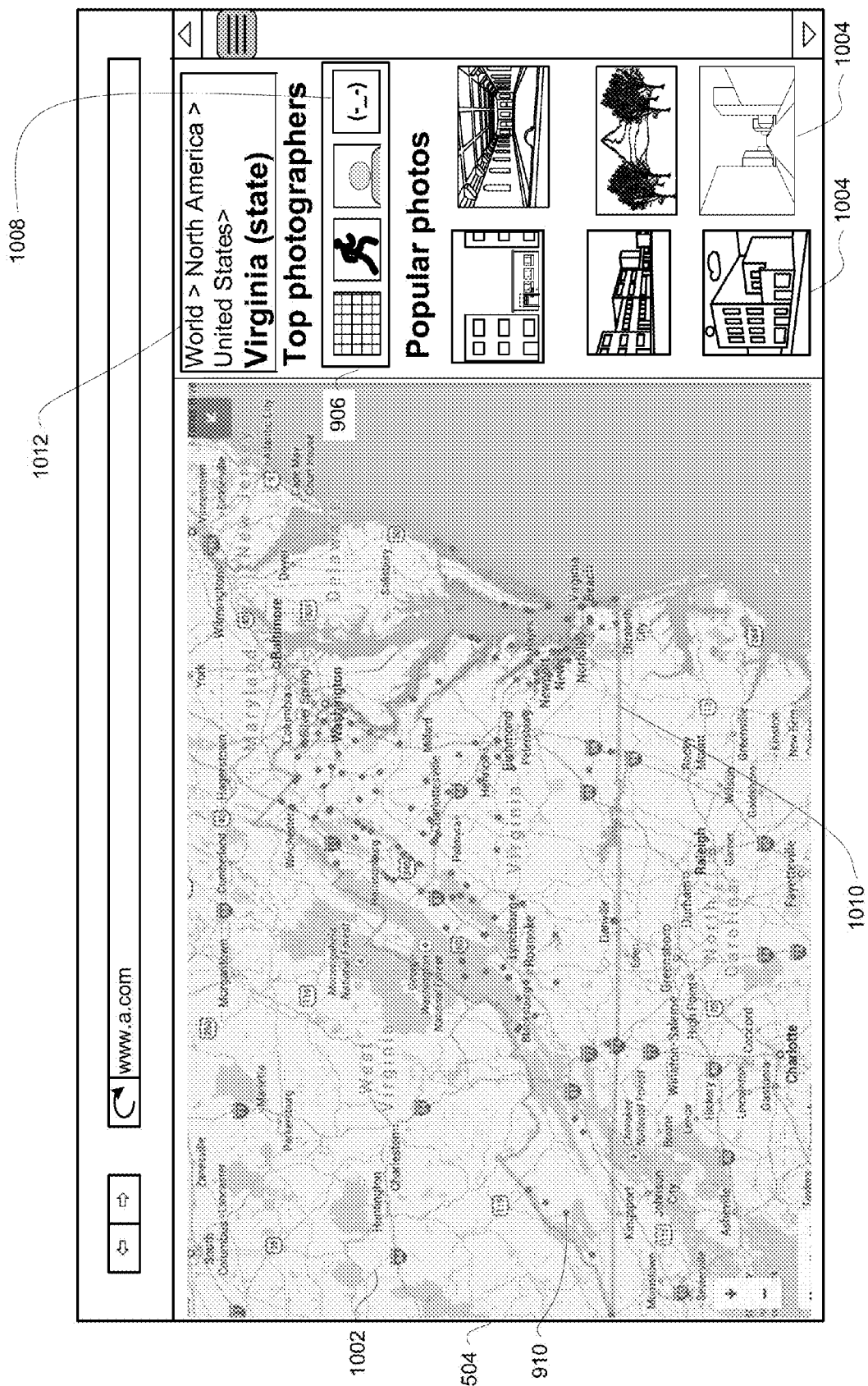
FIG. 10 is another example screen shot in accordance with aspects of the disclosure.

Map 902 may be divided into a set of geographic locations in the manner set forth above. For example, given the current zoom level of viewport 504, map 902 may be divided into state-level locations. Accordingly, the user may select one of the state-level locations that are displayed within the map. FIG. 10 shows screen shot 1000 of map 1002 in which the user has selected the state-level location of Virginia. The selection of Virginia may be identified in map 1002 by a visual indicia, such as Virginia's border 1010 being displayed, as well as by location identification 1012 being displayed. Upon the user selecting Virginia, the photographs 904 shown in FIG. 9 may be automatically updated to those photos 1004 that were taken within Virginia. In addition, the leaderboard 906 may also be updated so as to show the top contributors for photographs in Virginia. The points 910 shown on map 1002 may also be limited to locations within the selected state of Virginia for which one or more photographs have been taken.

Figure 11:
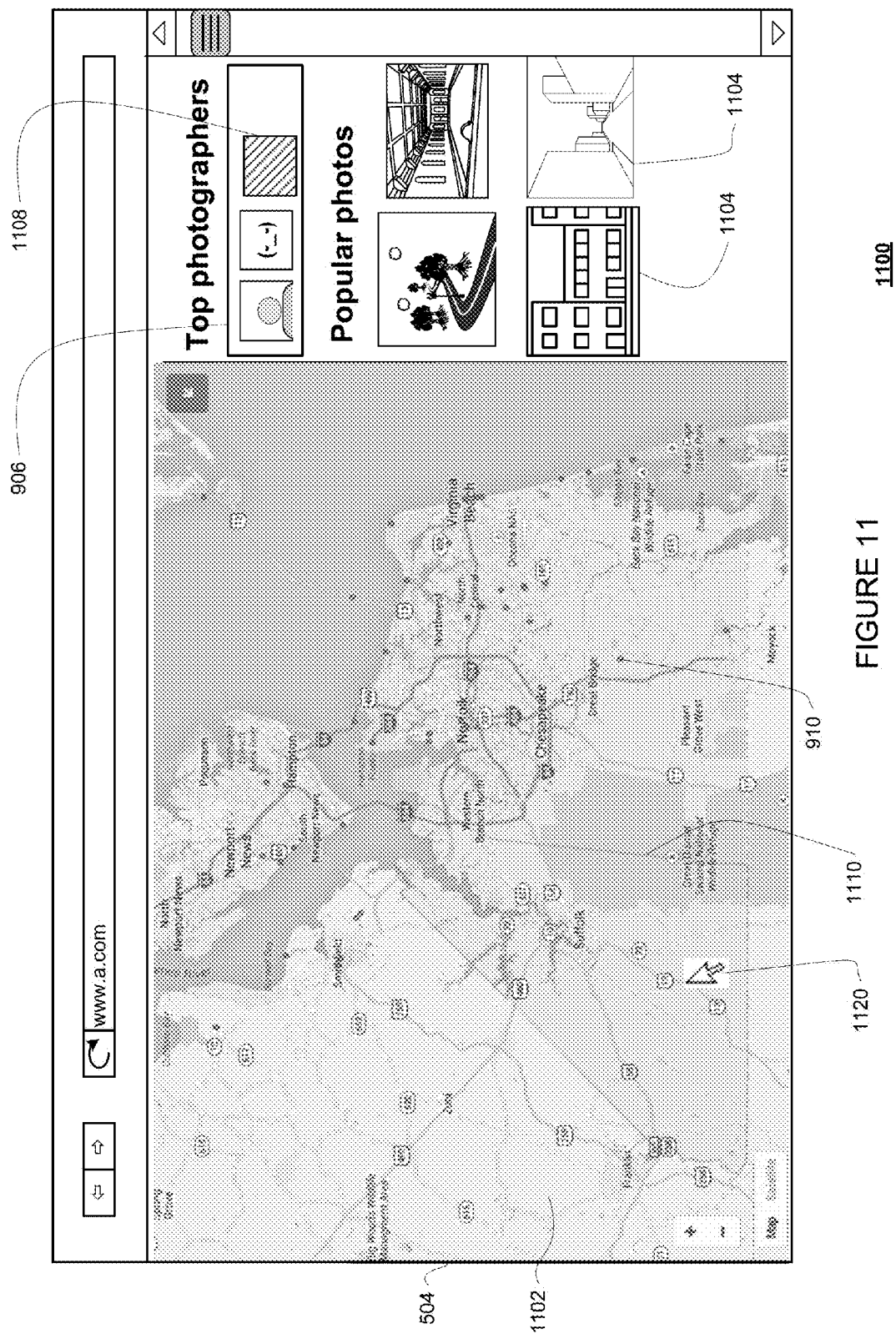
FIG. 11 is a further example screen shot in accordance with aspects of the disclosure.

As described above, the user may change the region shown within viewport 504. For example, the user may pan the map in one or more directions or may zoom in or out of the map. In accordance with one aspect, the disclosed system may automatically update the photographs and contributors displayed to the user as the user changes the map region shown in viewport 504. For example, FIG. 11 of screen shot 1100 shows map 1102 after the user has zoomed into the eastern part of Virginia. As the user zooms in from map 1002, the photographs 1004 shown in screen shot 1000 will be replaced by photographs 1104 shown in screen shot 1100. In particular photographs 1104 will be those photographs that were taken in the region shown in map 1102. Similarly, leaderboard 906 is also automatically updated to contain profile photos 1108 of the top contributors for the region shown in map 1102. As can be seen in FIGS. 10 and 11, some of the photographs 1004 and photographs 1104 may be the same, given that the region shown in map 1102 contains part of the region shown in map 1002. The same may be true for the profile photos 1008 and 1108 shown in leaderboard 906.

Given that map 1102 is at a different zoom level than map 1002, the geographic locations provided in map 1102 may also be different than those provided in map 1002. For example, while map 1002 provided state-level locations, map 1102 may provide county-level locations. In one aspect the user may move a cursor, such a mouse cursor 1120, over map 1102 in order to see the geographic locations that may be selected in map 1102. For example, as the user moves a cursor 1120 over map 1102, border 1110 is displayed. Border 1110 corresponds to a county-level geographic location of Suffolk, Va. Accordingly, map 1102 is not displaying the state-level location provided in map 1002, but is instead displaying county-level locations. As discussed above in connection with the state-level location of Virginia, the user may select the region within border 1110 in order to view any photographs taken in the county-level location of Suffolk. In addition, the user may continue to zoom into map 1102 in order to see city-level or neighborhood-level geographic locations, as well as any photographs associated with those geographic locations.

In accordance with one aspect, the geographic positions of the photographs shown in FIGS. 9-11 may be stored in accordance with a spatial index. In particular, the maps discussed above may be divided into a hierarchy of grids in which each point on the map is assigned to a series of grids that cover that particular point. In one example, the Earth may be projected onto a two-dimensional map, such as by using a Mercator projection. A hierarchy of grids may then be drawn onto the map by dividing the global map at zoom level zero into four equal squares and then dividing each of those squares into four equal squares. By continuing to divide each newly created square into four equal squares, the grid hierarchy may be obtained. Accordingly, each point within the map will be covered by a square at every level of the hierarchy. Each grid may be referenced by a grid ID. For example, each grid ID may take the form of a 64-bit set of data. In accordance with one aspect, grids that are close to one another may be given Grid IDs that are close in value to one another. In this way the grid IDs may be quickly searched for a given area in the map.

As discussed above, the disclosed system may provide a list of top contributors for any region displayed in the viewport 504. This list of top contributors may be obtained using the grid hierarchy. In particular, user generated content may include identification of a geographic position, such as a longitude/latitude coordinate. This longitude/latitude coordinate of each photograph may be converted to a list of grid IDs within the grid hierarchy that cover that particular coordinate. In addition, for each grid ID, a counter may be maintained indicating the number of photographs that a particular contributor has provided within that grid ID. In addition, a set of top contributors may be obtained for each grid ID by identifying some predetermined number of contributors within that grid ID who have provided the most photographs or the most popular photographs.

The map shown in the viewport may then be approximated using a list of selected grids from the grid hierarchy. These selected grids may be selected from different levels of the grid hierarchy, and may therefore be of different sizes. The top contributors for the region shown in the viewport may then be obtained by merging the top contributors for all of the selected grids. In particular, each contributor listed as a top contributor for one of the selected grids may be viewed as a candidate for being the top contributor in the region shown in the viewport. A determination may be made as to the total number of photographs that have been submitted by each candidate over all of the selected grids. The candidates may then be sorted based on the determined total so as to determine the top contributors for the viewport region. For example, the top ten contributors for the region may be displayed along with the map shown in the viewport.

A similar process may be used for particular geographic locations that have been selected by the user. In particular, the longitude/latitude coordinates of each photograph may be converted to a list of geographic locations, such as the neighborhood, city, county, state, and country in which the coordinates reside. A counter may then be updated for each of the listed geographic locations to indicate the number of photographs that user has provided for that geographic location. For example, in FIG. 10, the user selected the geographic location of Virginia. The top contributors listed in leaderboard 906 may be obtained by comparing the number of photographs, or the number of popular photographs, provided by each contributor in the selected geographic location, as maintained by the counter.

By providing a list of top contributors for any area, such as any geographic location or any region shown in the viewport, the disclosed system incentivizes contributors to provide more content. A similar process may be made for the photographs shown in FIGS. 9-11. For example, other users may be able to indicate the degree to which they like photographs that have been contributed. In accordance with one aspect, this information may be used to determine those photographs that are displayed for a given region, as well as those contributors identified as top contributors.

Figure 12:
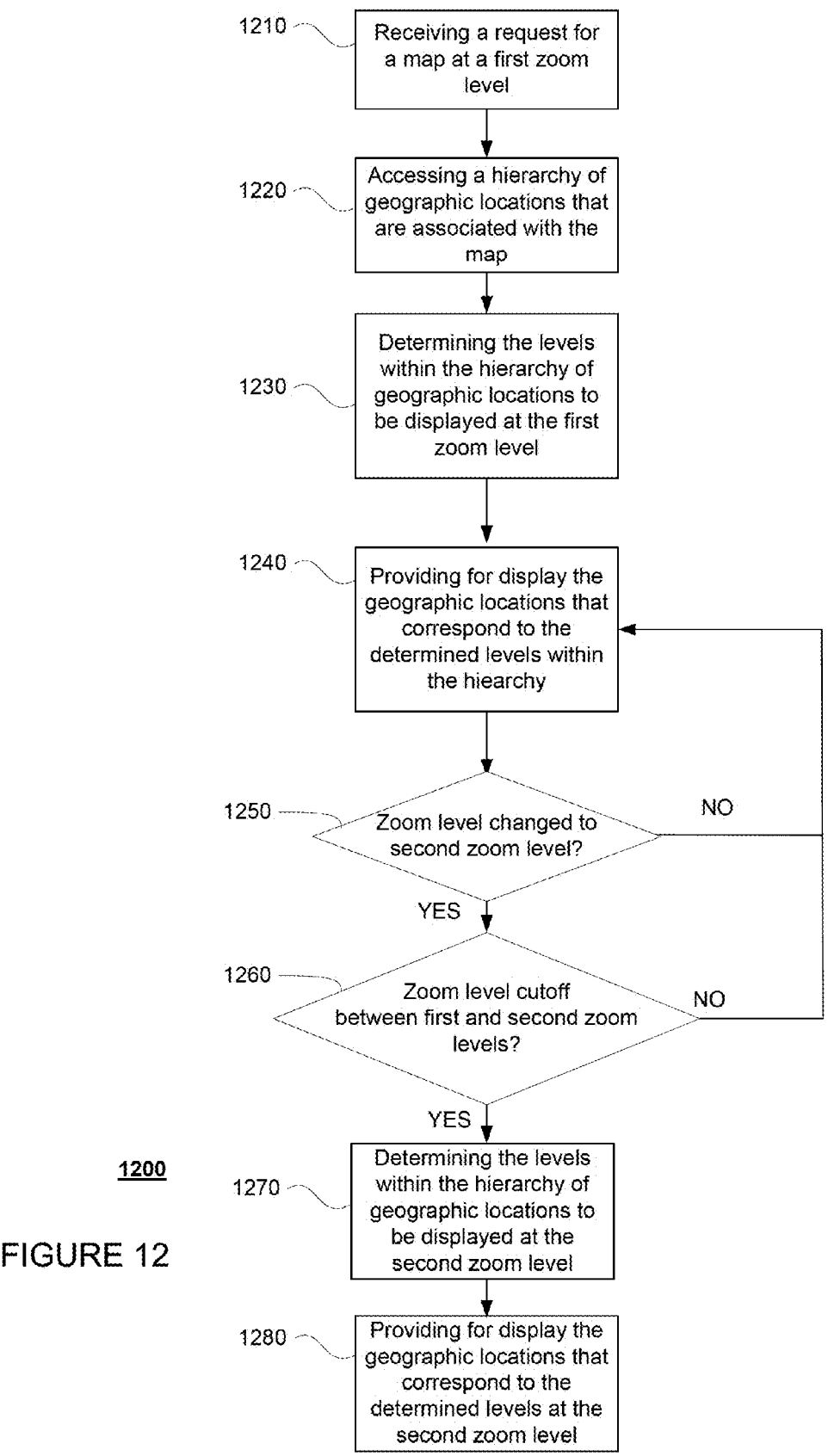
FIG. 12 is a flow diagram in accordance with aspects of the disclosure.

Flow diagram 1200 of FIG. 12 is an example of steps that may be performed by one or more computing devices, such as server computing devices 110 and/or client computing devices 120, 130, and 140, in accordance with aspects of the technology described herein. A request for a map at a first zoom level may be received (block 1210). A hierarchy of geographic locations that are associated with the map may be accessed (block 1220). A determination may be made as to the level or levels within the hierarchy of geographic locations that are to be displayed at the first zoom level (block 1230). Geographic locations that correspond to the determined levels within the hierarchy of geographic locations are provided for display (block 1240). A determination is made whether the zoom level has changed to a second zoom level (block 1250) and whether the transition between the first and second zoom level has caused the map to traverse through a zoom level cutoff (block 1260). As described above, a zoom level cutoff is the zoom levels at which the map will transition between at least one parent location and the parent location's corresponding children locations. If no zoom level cutoff has been traversed, the geographic locations corresponding to the originally determined hierarchical levels may be displayed. Otherwise, a determination may be made as to the appropriate levels within the hierarchy of geographic locations that are to be displayed (block 1270). The geographic locations corresponding to the determined hierarchical levels may then be displayed at the second zoom level (block 1280).

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for displaying map data comprising:
receiving, by one or more computing devices, a first request for a map at a first zoom level to be displayed within a viewport;
accessing, by the one or more computing devices, a hierarchy of geographic locations, each of the geographic locations of the hierarchy of geographic locations being associated with a plurality of zoom levels, the hierarchy of geographic locations having at least one parent geographic location corresponding to an area in which a plurality of child geographic locations are located;
for each given child geographic location of the plurality of child geographic locations, determining, by the one or more computing devices, a lowest zoom level of the plurality zoom levels for displaying the given child geographic location by comparing a size of an area of the given child geographic location with a size of an area of the viewport;
setting, by the one or more computing devices, a zoom level cutoff identifying when the map will transition between the parent geographic location and at least one of the plurality of child geographic locations such that the zoom level cutoff is greater than or equal to the determined lowest zoom levels for at least a predetermined percentage of the plurality of child geographic locations, wherein the predetermined percentage is less than 100 percent;
determining, by the one or more computing devices, a first set of the geographic locations, from the hierarchy of geographic locations, to be presented in the map at the first zoom level;
providing for display, by the one or more computing devices, the first set of geographic locations for a first map display;
receiving, by the one or more computing devices, a second request to view the map at a second zoom level;
determining, by the one or more computing devices, that the zoom level cutoff has been traversed based on the second request;
upon determining that the zoom level cutoff has been traversed, identifying, by the one or more computing devices, a second set of geographic locations, from the hierarchy of geographic locations, to be presented in the map at the second zoom level; and
providing for display, by the one or more computing devices, the second set of geographic locations for a second map display such that granularity of information presented to a user automatically changes between the first map display and the second map display as the user changes the zoom level of the map.

2. The method of claim 1, wherein:
the second zoom level is a higher level of zoom than the first zoom level;

the first set of geographic locations includes the at least one parent geographic location; and the second set of geographic locations includes one or more of the plurality of child geographic locations.

3. The method of claim 1, wherein:

the zoom level cutoff is one of a plurality of zoom level cutoffs;

the hierarchy of geographic locations includes a plurality of hierarchical levels; and wherein the plurality of zoom level cutoffs are arranged so that at least one zoom level exists in which all geographic locations for a particular hierarchical level are associated with the at least one zoom level.

4. The method of claim 1, further comprising:

accessing, by the one or more computing devices, information relating to the map;

wherein providing the first set of geographic locations for display further comprises providing for display, by the one or more computing devices, the information at a first granularity that corresponds to the first set of geographic locations; and wherein providing the second set of geographic locations for display further comprises providing for display, by the one or more computing devices, the information at a second granularity that corresponds to the second set of geographic locations.

5. The method of claim 1, wherein each determined lowest zoom level corresponds to a lowest zoom level of the plurality of zoom levels at which a particular child geographic location for that determined lowest zoom level will fill at least a predetermined percentage of the area of the viewport.

6. The method of claim 1, further comprising, determining a highest zoom level of the plurality of zoom levels for displaying the at least one parent geographic location by comparing a size of an area of the given child geographic location with a size of an area of the viewport such that all of the determined lowest zoom levels correspond to zoom levels of the plurality of zoom levels that are lower than the highest zoom level of the at least one parent geographic location.

7. The method of claim 1, wherein:

the second zoom level is a lower level of zoom than the first zoom level;

the first set of geographic locations includes one or more of the child geographic locations; and the second set of geographic locations includes the at least one parent geographic location.

8. A system for displaying map data, the system comprising one or more computing devices configured to:

receive a first request for a map at a first zoom level to be displayed within a viewport;

access a hierarchy of geographic locations, each of the geographic locations of the hierarchy of geographic locations being associated with plurality of zoom levels, the hierarchy of geographic locations having at least one parent geographic location corresponding to an area in which a plurality of child geographic locations are located;

for each given child geographic location of the plurality of child geographic locations, determine a lowest zoom level of the plurality of zoom levels for displaying the given child geographic location by comparing a size of an area of the given child geographic location with the size of the viewport;

set a zoom level cutoff identifying when the map will transition between the parent geographic location and at least one of the plurality of child geographic locations such that the zoom level cutoff is greater than or equal to the determined lowest zoom levels for at least a predetermined percentage of the plurality of child geographic locations, wherein the predetermined percentage is less than 100 percent;

determine a first set of the geographic locations, from the hierarchy of geographic locations, to be presented in the map at the first zoom level;

provide for display the first set of geographic locations for a first map display;

receive a second request to view the map at a second zoom level;

determine that the zoom level cutoff has been traversed based on the second request;

upon determining that the zoom level cutoff has been traversed, identify a second set of geographic locations, from the hierarchy of geographic locations, to be presented in the map at the second zoom level; and provide for display the second set of geographic locations for a second map display such that granularity of information presented to a user automatically changes between the first map display and the second map display as the user changes the zoom level of the map.

9. The system of claim 8, wherein:

the second zoom level is a lower level of zoom than the first zoom level;

the first set of geographic locations includes children geographic locations; and the second set of geographic locations includes the at least one parent geographic location.

10. The system of claim 8, wherein:

the zoom level cutoff is one of a plurality of zoom level cutoffs;

the hierarchy of geographic locations includes a plurality of hierarchical levels; and the plurality of zoom level cutoffs are arranged so that at least one zoom level exists in which all geographic locations for a particular hierarchical level are associated with the at least one zoom level.

11. The system of claim 8, wherein the one or more computing devices are further configured to access information relating to the map;

wherein providing the first set of geographic locations for display further comprises providing for display, by the one or more computing devices, the information at a first granularity that corresponds to the first set of geographic locations; and wherein providing the second set of geographic locations for display further comprises providing for display, by the one or more computing devices, the information at a second granularity that corresponds to the second set of geographic locations.

12. The system of claim 8, wherein each determined lowest zoom level corresponds to a lowest zoom level of the plurality of zoom levels at which a particular child geographic location for that determined lowest zoom level will fill at least a predetermined percentage of the area of the viewport.

13. The system of claim 8, further comprising, determining a highest zoom level of the plurality of zoom levels for displaying the at least one parent geographic location by comparing a size of an area of the given child geographic location with a size of an area of the viewport such that all of the determined lowest zoom levels correspond to zoom levels of the plurality of zoom levels that are lower than the highest zoom level of the at least one parent geographic location.

14. The system of claim 8, wherein:
the second zoom level is a higher level of zoom than the first zoom level;
the first set of geographic locations includes the at least one parent geographic location; and
the second set of geographic locations includes one or more of the plurality of child geographic locations.

15. A non-transitory computer readable recording medium on which instructions are stored, the instructions, when executed by one or more processors, cause the one or more processors to perform a method for displaying map data, the method comprising:
receiving a first request for a map at a first zoom level to be displayed within a viewport;
accessing a hierarchy of geographic locations, each of the geographic locations of the hierarchy of geographic locations being associated with plurality of zoom levels, the hierarchy of geographic locations having at least one parent geographic location corresponding to an area in which a plurality of child geographic locations are located;
for each given child geographic location of the plurality of child geographic locations, determining a lowest zoom level of the plurality of zoom levels for displaying the given child geographic location by comparing a size of an area of the given child geographic location with the size of the viewport;
setting a zoom level cutoff identifying when the map will transition between the parent geographic location and at least one of the plurality of child geographic locations such that the zoom level cutoff is greater than or equal to the determined lowest zoom levels for at least a predetermined percentage of the plurality of child geographic locations, wherein the predetermined percentage is less than 100 percent;
determining a first set of the geographic locations, from the hierarchy of geographic locations, to be presented in the map at the first zoom level;
providing for display the first set of geographic locations for a first map display;
receiving a second request to view the map at a second zoom level;
determining that the zoom level cutoff has been traversed based on the second request;
upon determining that the zoom level cutoff has been traversed, identifying a second set of geographic locations, from the hierarchy of geographic locations, to be presented in the map at the second zoom level; and
providing for display the second set of geographic locations for a second map display such that granularity of information presented to a user automatically changes between the first map display and the second map display as the user changes the zoom level of the map.

16. The medium of claim 15, wherein:
the second zoom level is a lower level of zoom than the first zoom level;
the first set of geographic locations includes one or more of the plurality of child geographic locations; and
the second set of geographic locations includes the at least one parent geographic location.

17. The medium of claim 15, wherein:
the zoom level cutoff is one of a plurality of zoom level cutoffs;
the hierarchy of geographic locations includes a plurality of hierarchical levels; and
wherein the plurality of zoom level cutoffs are arranged so that at least one zoom level exists in which all geographic locations for a particular hierarchical level are associated with the at least one zoom level.

18. The medium of claim 15, wherein the method further comprises:
access information relating to the map; and
wherein providing the first set of geographic locations for display further comprises providing for display, by the one or more computing devices, the information at a first granularity that corresponds to the first set of geographic locations, and
wherein providing the second set of geographic locations for display further comprises providing for display the information at a second granularity that corresponds to the second set of geographic locations.

19. The medium of claim 15, wherein each determined lowest zoom level corresponds to a lowest zoom level of the plurality of zoom levels at which a particular child geographic location for that determined lowest zoom level will fill at least a predetermined percentage of the area of the viewport.

20. The medium of claim 15, wherein the one or more computing devices are configured to determine a highest zoom level of the plurality of zoom levels for displaying the at least one parent geographic location by comparing a size of an area of the given child geographic location with a size of an area of the viewport such that all of the determined lowest zoom levels correspond to zoom levels of the plurality of zoom levels that are lower than the highest zoom level of the at least one parent geographic location.

* * * * *